(12) United States Patent
Satoh (10) Patent No.: US 6,455,120 B1
(45) Date of Patent: Sep. 24, 2002

(54) OPTICAL DISK

(75) Inventor: Takeshi Satoh, Tochigi-ken (JP)

(73) Assignee: Kao Corporation, Tokyo (JP)

( * ) Notice: Subject to any disclaimer, the term of this patent is extended or adjusted under 35 U.S.C. 154(b) by 87 days.

(21) Appl. No.: 09/598,364

(22) Filed: Jun. 21, 2000

(51) Int. Cl.$^7$ ................................................. B32B 3/02
(52) U.S. Cl. ...................................... 428/64.1; 428/64.4
(58) Field of Search .............................. 428/64.1, 64.2, 428/64.4, 457, 913; 430/270.12, 495.1, 945; 369/275.1, 283, 288

(56) References Cited

U.S. PATENT DOCUMENTS 6,007,889 A * 12/1999 Nee .......................... 428/64.1

FOREIGN PATENT DOCUMENTS

| JP | 6-055887 | 3/1994 |
| JP | 8-273201 | 10/1996 |
| JP | 9-081964 | 3/1997 |

* cited by examiner

Primary Examiner—Elizabeth Mulvaney
(74) Attorney, Agent, or Firm—Oblon, Spivak, McClelland, Maier & Neustadt, P.C.

(57) ABSTRACT

The present invention relates to an optical disk for which good reproduction can be obtained for light of any wavelength within the visible light region, and for which the visibility of visible information can also be ensured. By providing on pits of a transparent disk substrate 1(a), a recording layer 2(a) of a translucent reflective film for which, for light of a wavelength within the visible light region of 380~800 nm, the difference between the maximum reflectance and the minimum reflectance is 25% or below, and the minimum reflectance is within the range 20~65%, and moreover the difference between the maximum optical absorptance and the minimum optical absorptance is 25% or above, good reproduction can be achieved for light of any wavelength within the visible light region. Moreover the visible information printed on a printed layer (4a) is readily visible through the recording layer (2a).

15 Claims, 4 Drawing Sheets

OPTICAL DISK

BACKGROUND OF THE INVENTION

1. Field of the Invention

The present invention relates to an optical disk comprising a printed layer on a signal readout surface side of the disk, for displaying material such as the content of the recorded information, and in particular relates to an optical disk for which reproduction is possible using light of any wavelength within the visible light region (380 nm~800 nm), and moreover for which the visibility of visual information can be ensured.

2. Description of the Related Art

In conventional optical disks, typically a printed layer is provided for displaying visual information such as figures and symbols so that the content of the recorded information can be readily understood.

For example, in the case of single sided recording reproduction type optical disks such as CDs (compact disks), a printed layer, which is formed by methods such as screen printing or offset printing, is provided onto the protective layer positioned on the disk surface reverse to the information signal readout surface, and hence almost the entire surface of the disk can be used for displaying figures and symbols.

In contrast, in the case of double sided recording reproduction type optical disks, onto which larger volumes of information are able to be recorded, the regions of the disk on which a printed layer can be provided are limited to those portions outside of the information recording regions such as the very narrow region close to the central portion of the disk, so as not to obstruct the readout of the information signal. Consequently the surface area which can be used for the display of figures and symbols has been very restricted.

In order to resolve the above problem, attempts have been made to enlarge the display area for visible information on double sided recording reproduction type optical disks, and examples include the inventions disclosed in Japanese Unexamined Patent Publication No. 9-81964, Japanese Unexamined Patent Publication No. 6-55887, and Japanese Unexamined Patent Publication No. 8-273201.

The inventions above comprise two optical disk base bodies, each of which is formed by sequentially laminating an information signal layer of a translucent reflective film, a protective layer, and a printed layer onto an optical disk substrate, and which are then bonded together with the printed layers facing each other. Consequently, the information signal layer has a predetermined transparency, and the printed layer is visible from the disk substrate side of each disk base body which functions as the information signal readout surface, through the information signal layer and the protective layer.

With such a construction, a large surface area for the printing and display of figures and symbols can be ensured on both sides of the disk, without obstructing the readout of the information signal, even with double sided recording reproduction type optical disks.

The wavelength of the light used for reproduction, which is currently about 650 nm, is now on the trend towards shorter wavelengths because this enables further increases in the recording volume. As a result, an optical disk for which reproduction is possible with the light of any wavelength within the visible light region has been much sought after. However, the inventions disclosed in the aforementioned Japanese Unexamined Patent Publication No. 9-81964, Japanese Unexamined Patent Publication No. 6-55887, and Japanese Unexamined Patent Publication No. 8-273201 are unable to generate good reproduction with the light of a shorter wavelength than the wavelength of currently employed light. Moreover, also for the visibility of the visual information, adequate visibility cannot be obtained.

In order to achieve good reproduction, it is necessary for the recording layer of the translucent reflective film to have a comparatively high reflectance in the wavelength region of the laser light used for reproduction, thereby enabling the generation of a reproduction signal of sufficient signal strength. Consequently, a recording layer of an optical disk for which reproduction is possible with light of any wavelength within the visible light region of 380~800 nm, is required to vary little in terms of reflectance with variations in the wavelength of the light, that is, have a reflectance which displays a low wavelength dependence, and also have a reflectance which exceeds a certain value. On the other hand, it is known that when the visual information is viewed through the translucent reflective film of the recording layer, projection of the visible light reflected back at the recording layer and irregular reflections by the pits, in addition to attenuation of the visible light when passing through the recording layer, decrease the contrast of the dark/bright pattern on the printed layer, thereby lowering the visibility. Then, particularly for the translucent reflective film which displays a low wavelength dependence of the reflectance, the wavelength dependence of the optical attenuation of the translucent reflective film becomes a factor which affects the visibility of the visual information.

SUMMARY OF THE INVENTION

The present invention takes the above factors into consideration, with an object of providing an optical disk for which information reproduction are good for reproduction light of any wavelength within the visible light region and for which the visibility of visible information can also be ensured.

In order to achieve the above object, an optical disk according to a first aspect of the present invention comprises a transparent disk substrate, a recording layer formed from a translucent reflective film which is layered on pits based on signal information provided on the disk substrate, and a printed layer which is layered on the recording layer and on which is printed visible information, and is constructed so that the visible information of the printed layer is visible from the disk substrate surface through the recording layer, wherein the optical characteristics of the recording layer obtained through the disk substrate are such that for light of a wavelength within the visible light region, the difference between the maximum reflectance and the minimum reflectance is 25% or below, and the minimum reflectance is within the range 20~65%, and moreover wherein the difference between the maximum optical absorptance and the minimum optical absorptance is 25% or above.

With such a construction, the recording layer formed from a translucent reflective film is able to acquire a reproduction signal of sufficient strength for light of any wavelength within the visible light region, thereby enabling good reproduction, while also ensuring sufficient visibility of the visible information.

Furthermore with an optical disk of the present invention, preferably the recording layer utilizes a translucent reflective film material for which the optical absorptance either increases or decreases in moving from the short wavelength side to the long wavelength side within the visible light region. Specifically, materials such as silicon, an alloy incorporating silicon as a main component, a compound of silicon with either carbon or nitrogen, or a mixture of silicon and compound of silicon with either carbon or nitrogen should preferably be used.

Furthermore, with an optical disk of the present invention, an optical buffer layer formed from a light transmissive material may also be provided between the recording layer and the printed layer, and by so doing the electrical characteristics can be improved even further.

With an optical disk of the present invention, if the printed layer is constructed from a first printed layer for printing visible information, and a second printed layer for printing a background color for the visible information, then by selecting a suitable background color, the visibility of the visible information can be further improved. In such a case, if the second printed layer is formed of a single color by so-called contact printing, then the printing process is relatively simple.

In order to apply the present invention to a double sided recording reproduction type optical disk, an optical disk for which the optical characteristics of the recording layer are the type of characteristics according to the first aspect of the present invention may be used for at least one of a first optical disk and a second optical disk, with the first optical disk and the second optical disk then being bonded together with the respective substrates thereof facing outwards, thereby providing visible information on only one side of the double sided optical disk. Alternatively optical disks for which the optical characteristics of the recording layer are the type of characteristics according to the first aspect of the present invention may be used for both a first optical disk and a second optical disk, with the two disks then being bonded together with the printed layers facing each other, thereby providing visible information on both sides of the double sided optical disk. In either case, if an opaque adhesive layer is provided between the first optical disk and the second optical disk to bond the two disks together, then the visibility of the visible information is able to be improved.

With a double sided recording reproduction type optical disk of the present invention, preferably the recording layer, which achieves optical characteristics of the type according to the first aspect of the present invention, utilizes a translucent reflective film material for which the optical absorptance either increases or decreases in moving from the short wavelength side to the long wavelength side within the visible light region, and is constructed from a material such as silicon, an alloy incorporating silicon as a main component, a compound of silicon with either carbon or nitrogen, or a mixture of silicon and compound of silicon with either carbon or nitrogen. Furthermore, an optical buffer layer formed from a light transmissive material may also be provided between the recording layer and the printed layer. Moreover, the printed layer may also be constructed from a first printed layer for printing visible information, and a second printed layer for printing a background color for the visible information. In such cases, the second printed layer may be formed of a single color by so-called contact printing.

DESCRIPTION OF THE PREFERRED EMBODIMENTS

As follows is a description of a preferred embodiment of an optical disk of the present invention based on the drawings.

Figure 1:
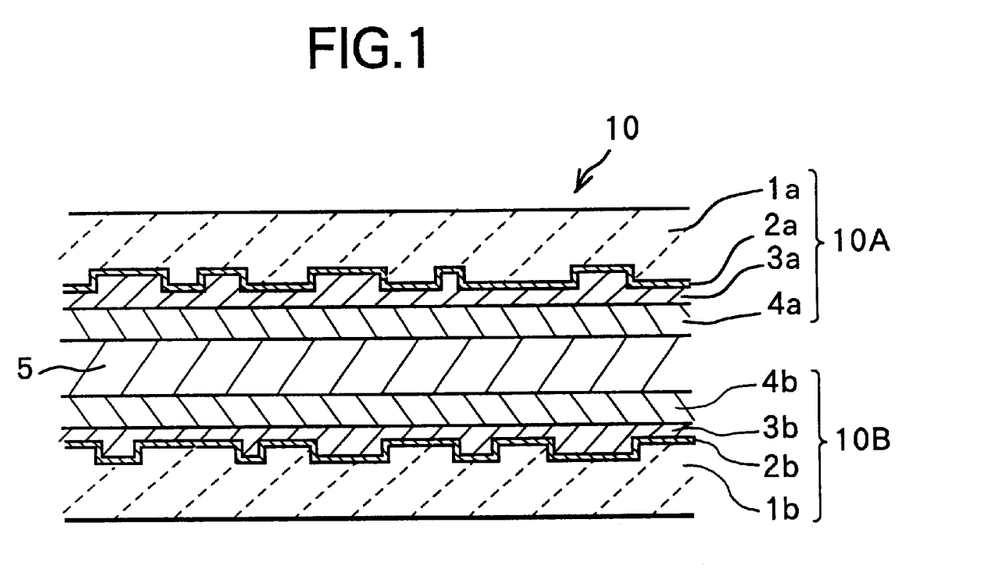
FIG. 1 is a longitudinal sectional view showing an embodiment of a construction of an optical disk of the present invention.

FIG. 1 is a longitudinal sectional view showing an example of a construction of an optical disk of the present invention.

In FIG. 1, a transparent, circular plate type disk substrate 1a is provided with grooves formed with a concavoconvex pattern corresponding to recorded information, and on the grooves is provided a recording layer 2a formed from a translucent reflective film which has a predetermined reflectance with respect to a reproduction light beam, and a predetermined transmittance within the visible light region. An optical buffer layer 3a of a light transmissive material is provided on the upper surface of the recording layer 2a. Moreover, a printed layer 4a on which is printed visual information such as text and figures is provided on top of the optical buffer layer 3a. This construction forms a first optical disk 10A. Furthermore in the same manner as the first optical disk 10A, a second optical disk 10B is formed by providing a recording layer 2b, an optical buffer layer 3b and a printed layer 4b on a disk substrate 1b. The first optical disk 10A and the second optical disk 10B are then bonded together using an adhesive 5 with the printed layers 4a, 4b facing each other, thereby forming a double sided recording reproduction type optical disk 10 of the present embodiment.

The disk substrate 1 is formed at a thickness of 0.6 mm by injection molding of a transparent synthetic resin such as a polycarbonate or polyacrylic resin, using a stamper with a surface comprising a concavoconvex pattern which is opposite to the pattern of the recording information.

The recording layer 2 is formed from a translucent reflective film on the concavoconvex pattern of the disk substrate 1, using sputtering techniques and with appropriate adjustment of the thickness of the layer, to achieve optical characteristics wherein, with respect to light within a wavelength region between 380 nm~800 nm, the difference between the maximum reflectance and the minimum reflectance is 25% or below, and the minimum reflectance is within the range 20~65%, and moreover wherein the difference between the maximum optical absorptance and the minimum optical absorptance is 25% or above. In order to ensure that a signal can be read for any wavelength within the light wavelength region between 380 nm~800 nm, a reflectance of 20% or above is required. At reflectance of less than 20% the electrical characteristics deteriorate leading to difficulties with reproduction, whereas if the minimum reflectance exceeds 65% then the readability of the visible information on the printed layer deteriorates significantly. If the difference between the maximum reflectance and the minimum reflectance for the wavelength region between 380 nm~800 nm is 25% or below, then a signal can be read with light of any wavelength within the light wavelength region between 380 nm~800 nm, but if the difference between the maximum reflectance and the minimum reflectance exceeds 25%, then certain wavelengths will exist for which a signal is unable to be read. Furthermore, with the difference between the maximum reflectance and the minimum reflectance of 25% or below, the reflectance distribution are relatively narrow. Therefore, if the distribution of the optical absorptance are also narrow, then the white light luster becomes overly strong to the human eye, making the visible information difficult to see. This phenomenon arises because both reflected light from the recording layer of the translucent reflective film, and transmitted light which has not been absorbed by the recording layer enters the human eye, and if both the reflection and absorption spectral distributions are flat (the distributions are narrow) then the eye sees a white color. Consequently, the distribution of the optical absorptance need to be large, and the difference between the maximum value and minimum value should preferably be 25% or above. In terms of optical absorptance characteristics, preferably a translucent reflective film should be used whose optical absorptance either increases or decreases in moving from the short wavelength side to the long wavelength side within the visible light region. The reason for this requirement is that the human eye has a sensitivity distribution known as a relative spectral sensitivity curve. Therefore, if the ease of visibility of visible information on the printed layer of an optical disk construction is considered in conjunction with this distribution, then the visible light which is not absorbed by the recording layer should preferably have a bias towards either the short wavelength side or the long wavelength side.

The translucent reflective film for forming the recording layer 2 should preferably be of silicon, or an alloy incorporating silicon as a main component, a compound of silicon with either carbon or nitrogen, or a mixture of silicon and compound of silicon with carbon or nitrogen.

A compound of silicon with either carbon or nitrogen, or a mixture of silicon and compound of silicon with either carbon or nitrogen should preferably be layered using reactive sputtering with silicon as a target and with a sputtering atmosphere comprising a mixture with $CH_4$ or $N_2$. In such a case, the mixing ratio of $CH_4$ or $N_2$ in the sputtering atmosphere should preferably be between 5~50%, and by appropriate setting of sputtering conditions such as the overall gas pressure, the film formation period, the film formation power, and the distance between the substrate and the target, a film with the desired reflectance and absorptance can be obtained. In the case of straight silicon, then in the same manner, by appropriate setting of the above sputtering conditions, a film with the desired reflectance and absorptance values can be obtained.

The optical buffer layer 3 is formed by applying, by means of spin coating techniques or the like, a transparent curable resin, preferably an acrylic based UV curable resin or the like, to achieve a thickness, measured in terms of optical distance, of between 3 μm~45 μm. In those cases where the optical buffer layer 3 is thin, unevenness can develop during formation of the optical buffer layer with the above type of application, whereas if the optical buffer layer 3 is thick, then the curvature of the optical disk itself increases. Consequently, the optical distance should be set within the aforementioned range of 3 μm~45 μm. The optical distance is the value of the physical distance L multiplied by the refractive index n of the material, and is represented by the formula L×n. For example in the case of an acrylic based resin, the value of the refractive index n is approximately n=1.5, and so in such a case the physical distance L would be a thickness of between 2.0 μm~30 μm. Even more preferable thickness values for the optical buffer layer 3 are optical distance values between 5 μm~35 μm. This enables disks to be obtained for which the electrical characteristics and the disk shape are even more stable. Moreover, the optical buffer layer 3 need not necessarily be absolutely transparent, but the imaginary part k of the complex refractive index should preferably satisfy the requirement that k≦1.0.

The printed layer 4 can be formed using techniques such as screen printing, offset printing or pad printing. The printed layer 4 should preferably comprise a first printed layer for printing, via mirror image printing for example, visible information such as text or figures in either a single color or multiple colors, and a second printed layer for printing a background color to prevent color mixture with the back surface. By so doing, color mixture between the visible information and the background color can be prevented, and the visibility of the visible information improved. In such cases, if the printing of the second printed layer is carried out to cover the entire printing region with a single color by so-called contact printing, then time and labor for positioning the plate and the like can be eliminated, and the formation of the printed layer 4 becomes simplified, thereby enabling simplification of the process for formation of the printed layer.

If a white colored, opaque adhesive is used as the adhesive 5, then color mixture between the visible information and the back surface can be prevented. Hence the second printed layer need not be provided in the printed layer 4.

With such a construction, the optical characteristics of the translucent reflective film which forms the recording layer 2 are such that the difference between the maximum reflectance and the minimum reflectance, with respect to light of a wavelength within the visible light region between 380 nm~800 nm, is 25% or below, and the minimum reflectance is within the range 20~65%. Moreover the difference between the maximum optical absorptance and the minimum optical absorptance is 25% or above. Consequently for any wavelength within the visible light region between 380 nm~800 nm, a good reflectance and a reproduction signal of sufficient signal strength can be obtained. Furthermore, the visibility of the visible information printed on the printed layer can also be ensured sufficiently. Moreover by producing a double sided recording reproduction type disk, the volume of recorded information can be increased.

The embodiment of FIG. 1 shows an example of a double sided recording reproduction type optical disk. However, the invention can also be applied to a single sided recording reproduction type optical disk such as a CD, using a substrate of thickness 1.2 mm. Furthermore, even in the case of double sided recording reproduction type optical disks, it is not necessarily a requirement for the first optical disk 10A and the second optical disk 10B to be of the same construction, as in the case shown in FIG. 1, and either one of the optical disks could also be constructed so that visible information is not visible from the signal readout surface side of the disk. In such a case, if a white colored opaque adhesive is used for the adhesive 5, then color mixture between the visible information and the back surface can be prevented. Hence a second printed layer need not be provided in the printed layer 4.

EXAMPLES

In order to describe the present invention in further detail, as follows is a presentation of a series of working examples and comparative examples.

Working Example 1

A polycarbonate resin was molded using an injection molding device (M35B-D-DM from Meiki Manufacturing Factory) equipped with a stamper prepared in accordance with information signals, to yield a disk substrate $1a$ of external diameter 120 mm and thickness 0.6 mm.

A recording layer $2a$ comprising a translucent reflective film of silicon was formed on the signal transfer surface of the disk substrate $1a$ using a sputtering apparatus (CDI-911 from Balzus Corporation) mounted with silicon target added with boron, and under conditions of an argon atmosphere, an electrical power input of 1.5 kw, and a sputtering time of 2.0 seconds. Measurement of the proportion of total reflected light with respect to the irradiated light from the disk substrate side, using a spectrophotometer (U-3120 from Hitachi Ltd.) mounted with an integrating sphere (150-0901; 150ϕ) and with wavelength scanning from 380~800 nm and a scanning speed of 120 nm/min, revealed a maximum reflectance within the wavelength region of 380~800 nm of 55%, and a minimum reflectance of 42%. The reflectance for a readout laser light of wavelength 650 nm was 50%, and the reflectance for a readout laser light of wavelength 400 nm was 45%. Furthermore, the maximum optical absorptance in the wavelength region between 380~800 nm was 50%, and the minimum value was 15%. An acrylic based resin (SK5100 from Sony Chemicals Corporation, refractive index n=1.5) was applied to the top of the recording layer $2a$ of the translucent reflective film using spin coating techniques, and subsequently cured with ultraviolet irradiation, to produce the optical buffer layer $3a$ with a film thickness of 7 μm (an optical distance of approximately 10 μm (film thickness×refractive index)).

A black colored ultraviolet light curable type ink (Dyecure 582 from Dainihon Inks) was used with a screen printing device to print a mirror image design incorporating both full width and quarter width text characters onto the surface of the optical buffer layer $3a$, and the ink was then cured with ultraviolet irradiation. Next, by using a white colored ultraviolet light curable type ink (Dyecure 583 from Dainihon Inks), a layer of contact printing was produced by means of a screen printing device and subsequently cured with ultraviolet irradiation, thereby forming the printed layer $4a$, and consequently the first optical disk 10A was obtained. The second optical disk 10B was produced using the same methods.

A hot melt adhesive was applied to the printed layer of both the first optical disk 10A and the second optical disk 10B, and the disks were then bonded together by bringing the adhesive surfaces together and pressing.

Figure 2A:
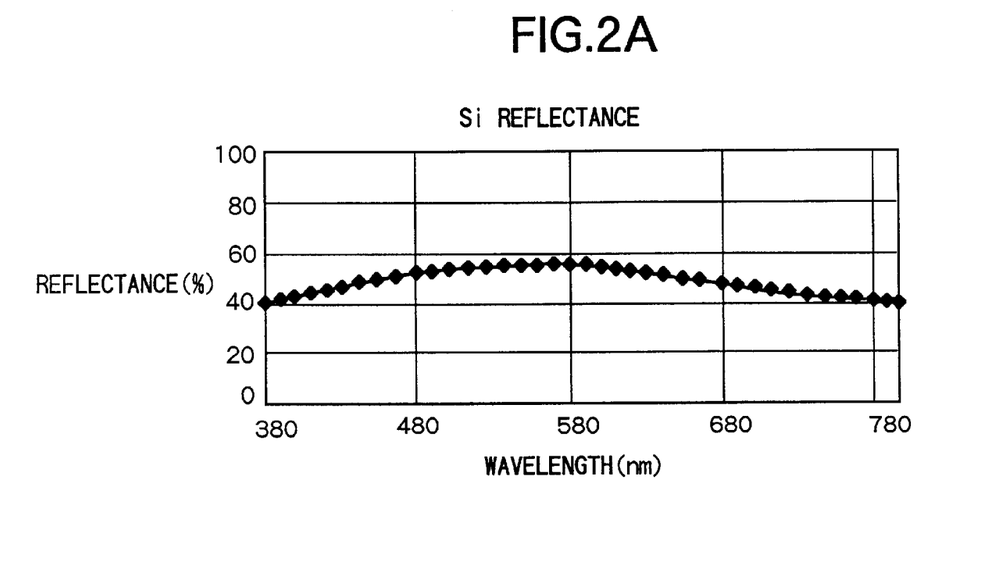
FIG. 2(A) is a graph showing reflectance characteristics within the visible light region of a first working example.
Figure 2B:
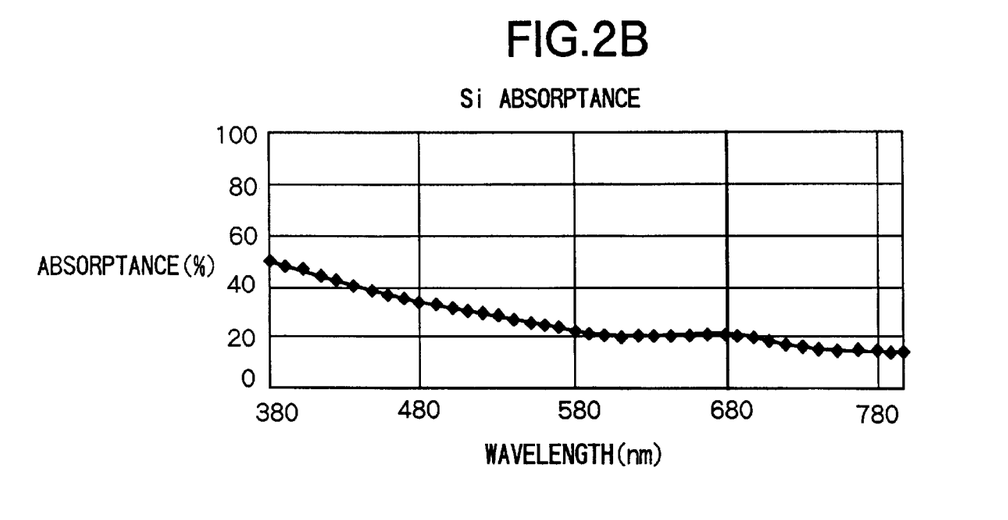
FIG. 2(B) is a graph showing absorptance characteristics.

The spectra of reflectance and absorption for the wavelength region between 380~800 nm are shown in FIG. 2(A) and FIG. 2(B) respectively.

Working Examples 2~5

With the exception of varying the reflectance of the translucent reflective film (recording layer) by appropriate alterations of the sputtering conditions, optical disks were prepared in the same manner as that described for the working example 1.

Working Examples 6~10

With the exceptions of setting the sputtering atmosphere to a mixture of argon and $CH_4$ (20%) and varying the reflectance of the translucent reflective film (recording layer) by appropriate alterations of the sputtering conditions, optical disks were prepared in the same manner as that described for the working example 1. In these cases the translucent reflective film comprises Si+SiC.

Working Examples 11~15

With the exceptions of setting the sputtering atmosphere to a mixture of argon and $N_2$ (20%) and varying the reflectance of the translucent reflective film (recording layer) by appropriate alterations of the sputtering conditions, optical disks were prepared in the same manner as that described for the working example 1. In these cases the translucent reflective film comprises $Si+Si_3N_4$.

Comparative Example 1

Figure 3A:
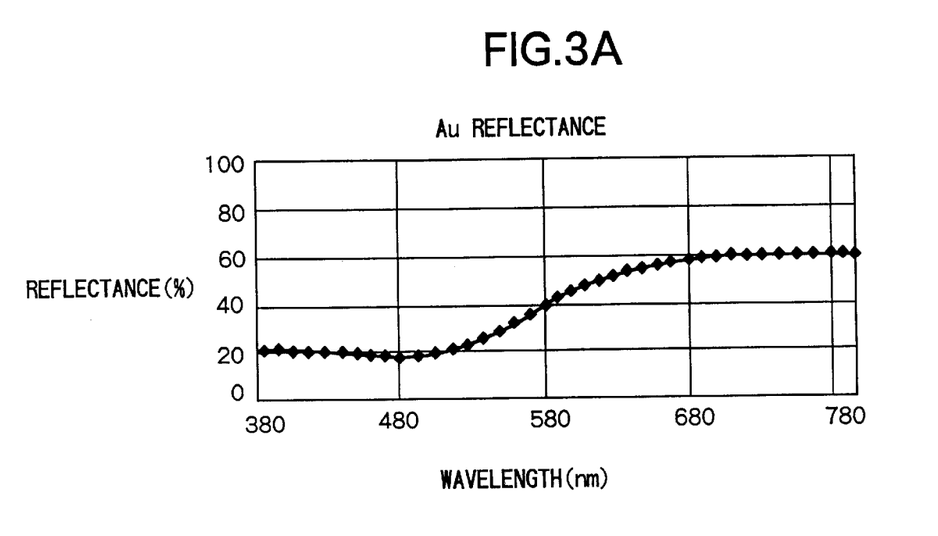
FIG. 3(A) is a graph showing reflectance characteristics within the visible light region of a first comparative example.
Figure 3B:
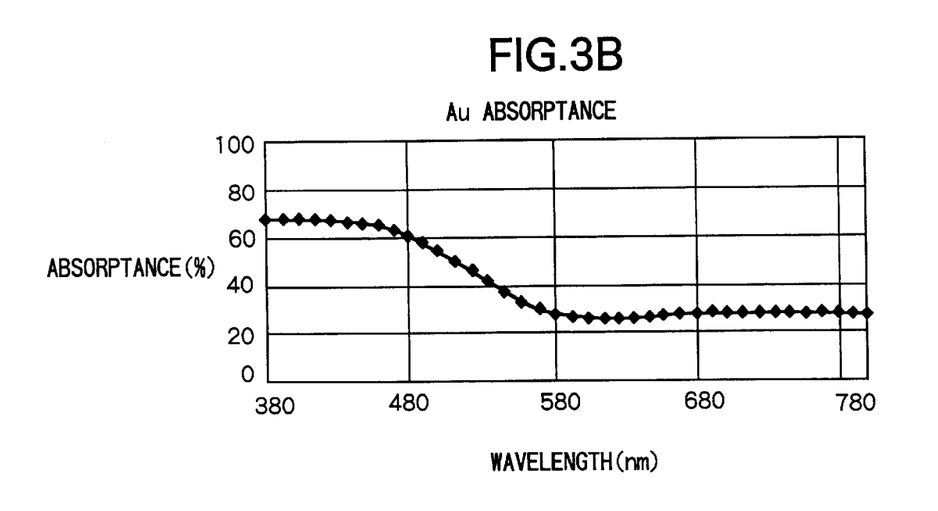
FIG. 3(B) is a graph showing absorptance characteristics.

With the exceptions of using Au as the translucent reflective film material and varying the sputtering conditions, an optical disk was prepared in the same manner as that described for the working example 1. The reflectance and absorption spectra for the wavelength region between 380~800 nm are shown in FIG. 3(A) and FIG. 3(B) respectively.

Comparative Example 2

With the exceptions of using Cu as the translucent reflective film material and varying the sputtering conditions, an optical disk was prepared in the same manner as that described for the working example 1.

Comparative Example 3

Figure 4A:
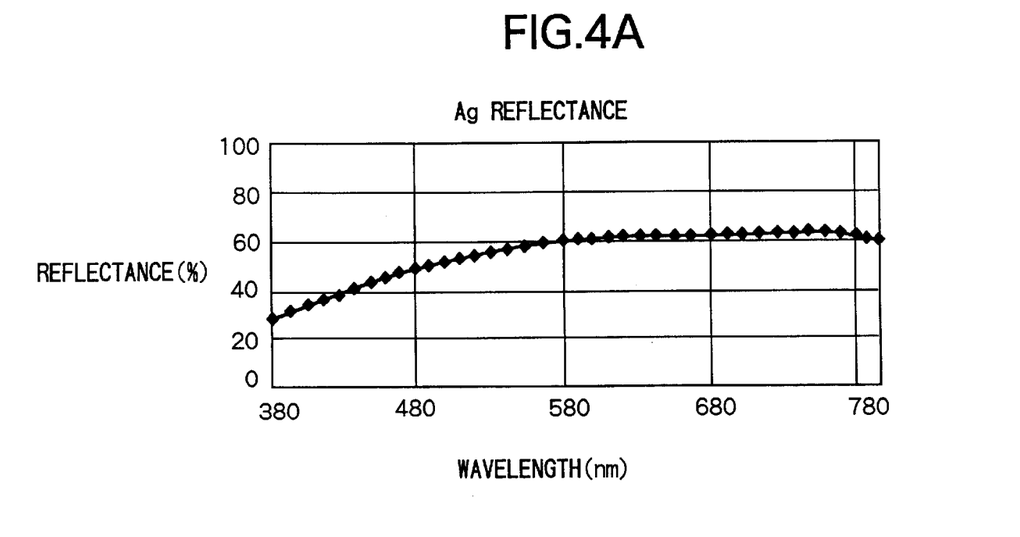
FIG. 4(A) is a graph showing reflectance characteristics within the visible light region of a third comparative example.
Figure 4B:
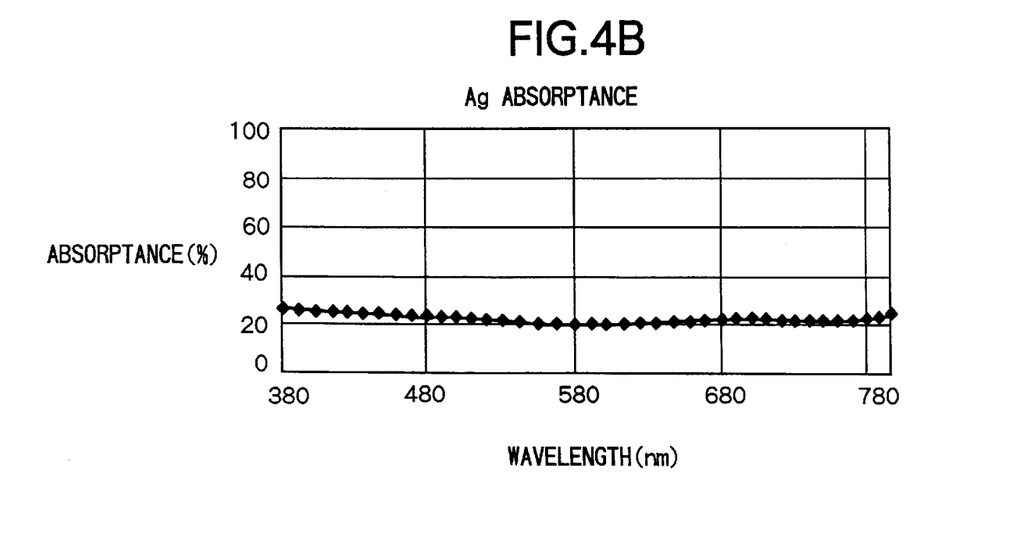
FIG. 4(B) is a graph showing absorptance characteristics.

With the exceptions of using Ag as the translucent reflective film material and varying the sputtering conditions, an optical disk was prepared in the same manner as that described for the working example 1. The reflectance and absorption spectra for the wavelength region between 380~800 nm are shown in FIG. 4(A) and FIG. 4(B) respectively.

Evaluations of the electrical characteristics and the visibility were conducted for the optical disks of each of the working examples 1~15 and each of the comparative examples 1~3.

The electrical characteristics were evaluated using a DDU-1100 device from PulseTech Corporation (readout laser wavelength of 650 nm, NA=0.6), by measuring the quality of the modulation factor and the jitter in signal readout for a wavelength of 650 nm, as well as the modulation factor and the jitter in signal readout for a wavelength of 415 nm by using the second harmonic of a YAG laser (830 nm). Furthermore, the visibility was judged to be acceptable if both the full width text characters and the quarter width text characters, as well as the printed design were readable. Optical disks for which either the electrical characteristics or the visibility was judged to be unacceptable were labeled NG.

The measurement results for each of the working examples 1~15 and each of the comparative examples 1~3 are shown in Table 1.

TABLE 1

| | Translucent reflective film material | Target | Sputtering atmosphere | Minimum reflectance within wavelength range 380~800 nm | Difference between maximum and minimum reflectance within wavelength range 380~800 nm | Difference between maximum and minimum absorptance within wavelength range 380~800 nm | Visibility | Signal readout at wavelength 650 nm | Signal readout at wavelength 415 nm |
|---|---|---|---|---|---|---|---|---|---|
| Working Example 1 | Si | Si | Ar | 42 | 13 | 35 | OK | OK | OK |
| Working Example 2 | Si | Si | Ar | 64 | 17 | 33 | OK | OK | OK |
| Working Example 3 | Si | Si | Ar | 40 | 18 | 35 | OK | OK | OK |
| Working Example 4 | Si | Si | Ar | 28 | 16 | 34 | OK | OK | OK |
| Working Example 5 | Si | Si | Ar | 21 | 10 | 37 | OK | OK | OK |
| Working Example 6 | Si + SiC | Si | Ar + CH$_4$ (20%) | 60 | 19 | 36 | OK | OK | OK |
| Working Example 7 | Si + SiC | Si | Ar + CH$_4$ (20%) | 51 | 17 | 35 | OK | OK | OK |
| Working Example 8 | Si + SiC | Si | Ar + CH$_4$ (20%) | 40 | 18 | 37 | OK | OK | OK |
| Working Example 9 | Si + SiC | Si | Ar + CH$_4$ (20%) | 30 | 15 | 34 | OK | OK | OK |
| Working Example 10 | Si + SiC | Si | Ar + CH$_4$ (20%) | 22 | 11 | 36 | OK | OK | OK |
| Working Example 11 | Si + Si$_3$N$_4$ | Si | Ar + N$_2$ (20%) | 60 | 18 | 34 | OK | OK | OK |
| Working Example 12 | Si + Si$_3$N$_4$ | Si | Ar + N$_2$ (20%) | 53 | 20 | 29 | OK | OK | OK |
| Working Example 13 | Si + Si$_3$N$_4$ | Si | Ar + N$_2$ (20%) | 42 | 19 | 32 | OK | OK | OK |
| Working Example 14 | Si + Si$_3$N$_4$ | Si | Ar + N$_2$ (20%) | 30 | 16 | 33 | OK | OK | OK |
| Working Example 15 | Si + Si$_3$N$_4$ | Si | Ar + N$_2$ (20%) | 22 | 12 | 36 | OK | OK | OK |
| Comparative Example 1 | Au | Au | Ar | 18 | 40 | 32 | OK | OK | NG |
| Comparative Example 2 | Cu | Cu | Ar | 55 | 38 | 28 | OK | OK | NG |
| Comparative Example 3 | Ag | Ag | Ar | 38 | 23 | 12 | NG | OK | OK |

As is apparent from the results in Table 1, the electrical characteristics and the visibility were evaluated as OK for all of the working examples 1~15. In the case of the comparative example 1 which uses an Au translucent reflective film, for which, as is shown in FIG. 3, the change in reflectance from the short wavelength side to the long wavelength side within the visible light region is large, and the difference between the maximum reflectance and the minimum reflectance exceeds 25%, and moreover for which the minimum reflectance at the short wavelength side is less than 20%, and also in the case of the comparative example 2 which displays similar tendencies to the comparative example 1, there were problems with the signal readout characteristics at 415 nm. Furthermore, in the case of the comparative example 3, which uses an Ag translucent reflective film which meets the requirements of the present invention with regard to the reflectance within the visible light region, but for which the difference between the maximum and minimum optical absorptance values is less than 25% as is shown in FIG. 4, satisfactory results were obtained in terms of the electrical characteristics, but there were problems with regard to the visibility of the visible information.

What I claim is:

1. An optical disk comprising a transparent disk substrate, a recording layer formed from a translucent reflective film which is layered on pits based on signal information provided on said disk substrate, and a printed layer which is layered on top of said recording layer and on which is printed visible information, and constructed so that said visible information of said printed layer is visible from said disk substrate surface through said recording layer, wherein optical characteristics of said recording layer obtained through said disk substrate are such that for light of a wavelength within a visible light region, a difference between a maximum reflectance and a minimum reflectance is 25% or below, and said minimum reflectance is within a range between 20–65%, and wherein a difference between a maximum optical absorptance and a minimum optical absorptance is 25% or above.

2. The optical disk according to claim 1, wherein an optical absorptance of said recording layer either increases or decreases in moving from a short wavelength side to a long wavelength side within said visible light region.

3. The optical disk according to claim 1, wherein said recording layer is silicon, an alloy incorporating silicon as a main component, a compound of silicon with either carbon or nitrogen, or a mixture of silicon and compound of silicon with either carbon or nitrogen.

4. The optical disk according to claim 1, wherein an optical buffer layer formed from a light transmissive material is provided between said recording layer and said printed layer.

5. The optical disk according to claim 1, wherein said printed layer is constructed from a first printed layer for printing visible information and a second printed layer for printing a background color for said visible information.

6. The optical disk according to claim 5, wherein said second printed layer is formed by contact printing of a single color.

7. An optical disk in which at least one of a first optical disk and a second optical disk comprises a transparent disk substrate, a recording layer formed from a translucent reflective film which is layered on pits based on signal information provided on said disk substrate, and a printed layer which is layered on top of said recording layer and on which is printed visible information, and is constructed so that said visible information of said printed layer is visible from said disk substrate surface through said recording layer, and has optical characteristics of said recording layer obtained through said disk substrate such that for light of a wavelength within a visible light region a difference between a maximum reflectance and a minimum reflectance is 25% or below, and said minimum reflectance is within a range between 20–65%, wherein a difference between a maximum optical absorptance and a minimum optical absorptance is 25% or above, and wherein said first optical disk and said second optical disk are bonded together with respective substrate surfaces thereof facing outwards.

8. The optical disk according to claim 7, wherein said first optical disk and said second optical disk are bonded together by an opaque adhesive layer provided therebetween.

9. The optical disk according to claim 7, wherein both said first optical disk and said second optical disk comprise a transparent disk substrate, a recording layer formed from a translucent reflective film which is layered on pits based on signal information provided on said disk substrate, and a printed layer which is layered on top of said recording layer and on which is printed visible information, and are constructed so that said visible information of said printed layer is visible from said disk substrate surface through said recording layer, and have optical characteristics of said recording layer obtained through said disk substrate such that for light of a wavelength within the visible light region a difference between a maximum reflectance and a minimum reflectance is 25% or below, and said minimum reflectance is within a range between 20–65%, and wherein a difference between a maximum optical absorptance and a minimum optical absorptance is 25% or above, wherein said first optical disk and said second optical disk are bonded together with respective printed layers facing each other.

10. The optical disk according to claim 9, wherein said first optical disk and said second optical disk are bonded together by an opaque adhesive layer provided therebetween.

11. The optical disk according to claim 7, wherein an optical absorptance of said recording layer either increases or decreases in moving from a short wavelength side to a long wavelength side within said visible light region.

12. The optical disk according to claim 7, wherein said recording layer is silicon, an alloy incorporating silicon as a main component, a compound of silicon with either carbon or nitrogen, or a mixture of silicon and compound of silicon with either carbon or nitrogen.

13. The optical disk according to claim 7, wherein an optical buffer layer formed from a light transmissive material is provided between said recording layer and said printed layer.

14. The optical disk according to claim 7, wherein said printed layer is constructed from a first printed layer for printing visible information and a second printed layer for printing a background color for said visible information.

15. The optical disk according to claim 14, wherein said second printed layer is formed by contact printing of a single color.

* * * * *